US008867120B2

(12) United States Patent
O'Keeffe (10) Patent No.: US 8,867,120 B2
(45) Date of Patent: Oct. 21, 2014

(54) REFLECTIVE DISPLAY DEVICE (71) Applicant: Vlyte Innovations Limited, County Clare (IE)

(72) Inventor: Donal O'Keeffe, County Clare (IE)

(73) Assignee: Vltyte Innovations Limited, County Clare (IE)

( * ) Notice: Subject to any disclaimer, the term of this patent is extended or adjusted under 35 U.S.C. 154(b) by 0 days.

(21) Appl. No.: 13/747,580

(22) Filed: Jan. 23, 2013

(65) Prior Publication Data

US 2013/0188239 A1    Jul. 25, 2013

(30) Foreign Application Priority Data

Jan. 23, 2012   (IE) .................................. S2012/0035

(51) Int. Cl.
G02B 26/00 (2006.01)
G09G 3/34 (2006.01)
B01J 13/02 (2006.01)
G02F 1/1335 (2006.01)
G02F 1/1334 (2006.01)
G02F 1/167 (2006.01)

(52) U.S. Cl.
CPC .......... *G02F 1/167* (2013.01); *G02F 1/133504* (2013.01); G02F 2001/1678 (2013.01); *G02F 1/1334* (2013.01)
USPC ............. 359/296; 359/228; 345/87; 345/107; 264/4.7

(58) Field of Classification Search
CPC ...... G02B 26/00; G02B 26/02; G02B 26/026; G09G 3/34; G09G 3/344; G02F 1/167; G02F 1/1334; G02F 1/133504; B01J 13/02; B01J 13/06; B01J 13/08; A61K 9/50

USPC ................ 359/228, 253, 290, 291, 296, 298; 345/55, 66, 107; 264/4, 4.1, 4.3, 4.33, 264/4.7; 349/86, 88, 89, 162, 166

See application file for complete search history.

(56) References Cited

U.S. PATENT DOCUMENTS

| 5,976,405 | A | 11/1999 | Clikeman et al. |
| 6,120,701 | A | 9/2000 | Hsu |
| 6,203,723 | B1 | 3/2001 | Hsu |
| 6,204,900 | B1 * | 3/2001 | Fergason ..................... 349/86 |
| 6,767,637 | B2 * | 7/2004 | Park et al. ................ 428/402.21 |
| 6,819,471 | B2 * | 11/2004 | Amundson et al. ............. 359/296 |
| 6,865,010 | B2 * | 3/2005 | Duthaler et al. ............. 359/296 |
| 7,109,968 | B2 | 9/2006 | Albert et al. |
| 7,397,530 | B2 | 7/2008 | Dyrli et al. |
| 7,411,719 | B2 | 8/2008 | Paolini et al. |
| 7,417,787 | B2 | 8/2008 | Chopra et al. |
| 7,557,875 | B2 * | 7/2009 | Majumdar et al. ............. 349/89 |
| 7,773,064 | B2 * | 8/2010 | Doane et al. .................... 345/87 |
| 7,796,103 | B2 * | 9/2010 | Doane et al. .................... 345/87 |

* cited by examiner

*Primary Examiner* — Loha Ben
(74) *Attorney, Agent, or Firm* — Sughrue Mion, PLLC (57) ABSTRACT A method of manufacturing a reflective display device comprises depositing an electro-optical ink on a substrate, the electro-optical ink comprising a plurality of microencapsulated electro-optical fluid shells dispersed in a polymer precursor. The electro-optical ink is cured to provide an electro-optical layer in which the shells are maintained in a polymer matrix having at least two-phases. At least one of the phases in the polymer matrix has a refractive index differing from the shells. At least one electrode is provided in contact with the electro-optical layer to, in use, control the state of the electro-optical layer.

24 Claims, 8 Drawing Sheets

REFLECTIVE DISPLAY DEVICE

RELATED APPLICATIONS

The present invention relates to: co-pending PCT application entitled "A Method For Microencapsulating Electro-Optical Fluid" claiming priority from Irish Application Nos. S2012/0033 and S2012/0034.

FIELD

The present invention relates to a method for making a reflective display device.

BACKGROUND

Reflective displays reflect ambient light similar to printed images; by contrast, conventional flat panel displays require a separate light source called a backlight. The brighter the ambient light the brighter a reflective display becomes, and this is particularly noticeable in sunlight and outdoor applications as the screen will be just as comfortable to view as it is indoors, however a backlit screen that appears bright indoors will become washed out and difficult to read outdoors. For example, the screen of a backlit mobile/cell phone can be difficult to read in direct sunlight. Applications that favor reflective displays include ebook readers, mobile devices for outdoor and indoor use, outdoor billboard displays, public information displays, see-through window displays, digital advertising displays, signage, and displays in automotive applications.

Reflective display technologies include reflective twisted nematic liquid crystal, reflective guest host liquid crystal, chiral nematic liquid crystal, polymer dispersed liquid crystal, electrophoretic ink, electrowetting, quick response liquid powder, interferometric modulator display/MEMS, and electrochromic.

Within the prior art reflective display technologies two have been demonstrated with a technique that involves microencapsulation of an electro-optical fluid: liquid crystal and electrophoretic ink. Microencapsulation preserves the fluid nature of an electro-optical fluid inside a solid form—discrete, sealed volumes enclosed inside a polymer wall or skin and referred to as a shell or capsule—before being coated onto a substrate and used in a display device. The known techniques for microencapsulation can be divided into two types:

a) The hydrophilic shell (synonymous with capsule) type: the bulk polymer in a shell has a dominant hydrophilic nature. Generally the prior art methods require the majority by weight of the polymer wall precursors to be water soluble and to be solubilized in an aqueous phase at some point during the microencapsulation process.

b) The hydrophobic shell (synonymous with capsule) type: the bulk polymer in a shell has a dominant hydrophobic nature. Generally the prior art methods require the majority by weight of the polymer wall precursors to be soluble or partly soluble in the electro-optical fluid to be microencapsulated.

The former type includes conventional and complex coacervation, and interfacial polymerization processes, and up to now coacervation has been demonstrated for electrophoretic ink microencapsulation.

The hydrophilic-shell type of microencapsulation uses at least one significant polymer wall component that is soluble in an aqueous phase and so the resulting shell or capsule wall polymer will be permeable to moisture, or even hydroscopic. Normally, a barrier to the ingress of atmospheric moisture has to be used such as a hermetic sealing wall around the display (i.e., an edge seal). Eink Holdings' U.S. Pat. No. 7,109,968 discloses a technique for microencapsulating electrophoretic ink using a complex coacervation process, and U.S. Pat. No. 6,120,701 discloses a technique for microencapsulating nematic liquid crystal using an interfacial polymerisation process.

In the hydrophobic-shell type, a shell's wall is generally formed from hydrophobic monomers having a slight hydrophilic functionality. Ahead of microencapsulating, the monomers are solubilized partly or completely in the hydrophobic, electro-optical fluid and as polymerization proceeds the polymer phase separates from the electro-optical fluid and forms at the interface with the aqueous phase and microencapsulates the electro-optical fluid with a hydrophobic polymer wall. For examples of liquid crystal microencapsulated in this way, see Rohm and Haas Company's U.S. Pat. No. 5,976,405 or PolyDisplay's U.S. Pat. No. 7,397,530.

Once an electro-optical fluid is microencapsulated it can be dispersed in a solution containing polymer matrix (synonymous with binder) precursors to form an electronic ink. This electronic ink can be coated or printed onto a variety of flexible and rigid substrates. The coated/printed ink is then formed into a solid (by curing or film forming techniques) consisting of discrete volumes of electro-optical fluid enclosed inside polymer shells that in turn are dispersed in a polymer matrix to form the electro-optical layer of a reflective display device. The electro-optical fluid and shells are referred to as the discontinuous phase while the polymer matrix/binder is referred to as the continuous phase, and generally the electro-optical layer is said to comprise two phases.

An important characteristic of the electro-optical layer of such devices is the reflectivity of the white state and how this compares with paper. A viewer's perception of the quality and suitability of a reflective display device may well be influenced by how close its white state is perceived to match the whiteness of paper. In addition, if a display were to have high white-state reflectivity, it could favorably be used with an overlaid color filter to make bright color displays. The color filter comprises a matrix of three or more colors arranged in so called Red-Green-Blue or PenTile (trademark of Samsung) matrices, and works with a monochrome (i.e., black and white) electro-optical layer (i.e., liquid crystal or electrophoretic Ink) to define addressable pixels (picture elements). Each pixel comprises three or more subpixels with the subpixels directing white light at their corresponding color areas in the filter. The eye combines the color and light intensity of the subpixels to resolve a single color and brightness level for a given pixel.

But the perceived whiteness and light reflectance of prior art microencapsulated, electro-optical devices is significantly poorer than white paper, and a side-by-side comparison shows the former to be grey in appearance rather than white. Hence, there is a need for reflective display devices having improved whiteness and light reflectance, and improved reflectance/brightness in color applications.

SUMMARY OF THE INVENTION

The present invention applies to display devices having electro-optical fluid of the electrophoretic ink and liquid crystal types. References in this document to electro-optical fluid are applicable to both types.

According to the present invention there is provided a method of manufacturing a reflective display device comprising:

providing a substrate;

depositing an electro-optical ink on said substrate, said electro-optical ink comprising a plurality of microencapsulated electro-optical fluid shells dispersed in a polymer precursor;

curing said electro-optical ink to provide an electro-optical layer in which said shells are maintained in a polymer matrix including at least two-phases, at least one of said phases having a refractive index differing from that of said shells;

providing at least one electrode in contact with said electro-optical layer to, in use, control the state of said electro-optical layer.

Preferably, at least one of said phases has a refractive index closely matching that of said shells.

Embodiments of the present invention enhance diffuse light reflection from the viewer face of a reflective display device in its white state by adding at least one additional phase to its electro-optical layer, this additional phase(s) having a different refractive index to the other phases in the layer and making up part of the volume other than the electro-optical fluid phase in the layer and introducing to the electro-optical layer, light scattering centers at the interfaces between such phase and the other phases in the electro-optical layer, the level of diffuse reflected light from the electro-optical layer being a summation of diffuse reflected light from such scattering centers and from the electro-optical fluid phase.

In certain embodiments the additional phase is air, a gas or vacuum, and preferably the electro-optical layer includes three states of matter: a gas, a liquid, and a solid. In other embodiments the additional phase is dispersed, high refractive index solids/particles, and preferably such solids/particles have a multifaceted/rough surface. In yet other embodiments the additional phase is dispersed crystalline polymer.

In some embodiments, the refractive index difference between an (amorphous) polymer matrix phase and the additional phase(s) is preferably <1.0, more preferably <0.75, and most preferably <0.6.

In certain embodiments the additional phase comprises an air phase that can be a continuous phase or a discontinuous phase distributed spatially within the cured polymer matrix, the air phase displacing partly the polymer matrix (synonymous with binder) phase. In other embodiments, the polymer matrix phase is amorphous and near continuous and has dispersed within it discrete, high-index solids/particles, or polymer crystallite grains/spherulites. In the latter case, the polymer matrix is semicrystalline comprising an amorphous phase and a crystalline phase, and the amorphous phase is interspersed between randomly distributed crystallite grains or spherulites.

The electro-optical layer of embodiments scatters light by reflection, refraction and diffraction and this light is characterized by two components:

1. A first component derived from light scattering centers created in the electro-optical layer not just between the added phase and the amorphous, polymer matrix phase, but also between the added phase and the surface of the shells; and
2. A second component is derived from the electro-optical volume inside shells scattering light more efficiently as a consequence of introducing the multi-phase polymer matrix.

The level of diffuse reflected light from the front face of a reflective, display device is then a summation of these two components and arises from interfaces (preferably multifaceted) between mediums of differing refractive index in the electro-optical layer that are both outside the discrete electro-optical volumes, and inside such volumes.

In embodiments of reflective, electrophoretic-ink display devices the white state's diffuse reflectance is ≥40%, and more preferably ≥45%, and most preferably ≥50%.

In embodiments of reflective, liquid crystal display devices the white state's diffuse reflectance is ≥30%, and more preferably ≥40%, and most preferably ≥45%.

For electrophoretic ink embodiments of the present invention, for pixels in the black state, a halo-effect arises because diffuse reflected light from areas within the electro-optical layer that are between shells is partly absorbed by black particles in neighboring shells. In this regard there is an analogy with the phenomenon known as 'optical dot gain' for inkjet print on paper.

Embodiments exploit a viewer's greater sensitivity to contrast than to luminance to enhance the luminance of the white state without sacrificing contrast with the black state, or a viewer's perception of the saturation of the black state. Even if the black state has increased absolute luminance, a viewer's visual perception has greater sensitivity to contrast and so, in use, black pixels (i.e. pixels in the black state) in the present invention will appear darker side-by-side with white pixels (i.e. pixels in the white state) having increased luminance.

In liquid crystal display embodiments operated in the black state, light is focused by a front semi-sphere of a shell to pass through a portion of a shell's rear semi-sphere that has an optical interface to a black light-absorbing layer ensuring that the light-ray bundle defined by that circular optical interface is absorbed with negligible surface reflection.

In electrophoretic ink device embodiments, the 'white' particle can be replaced by a color particle (synonymous with pigmented particle), and where this pertains, the disclosed teachings for the 'white' state can readily be applied to a color state. An analogous situation exists for color liquid crystal devices where the color arises from dichroic dye with selective absorption solubilized in the liquid crystal phase.

For color devices produced according to the present invention, diffuse white light reflected to the viewer by multifaceted air/polymer interfaces in the electro-optical layer increases the spectral power distribution of a color, yet due to the phenomenon known as metamerism, the apparent colors of a display device can be matched with colors produced without white light in its spectral power distributions (i.e., without all visible light wavelengths).

Preferably, the shell volume concentration in the electro-optical layer, expressed as a percentage of the overall volume comprising shells and polymer matrix/binder, exhibits a critical percentage. The critical percentage is when there is just insufficient polymer matrix to fully coat shells and form a continuous phase throughout an electro-optical layer necessitating at least one other phase (e.g., air, or high-index, solid particles). In practice the shell volume concentration in embodiments of the present invention is generally well in excess of this critical percentage. By contrast, in the prior art the shell volume concentration must be less than this critical percentage.

In embodiments having a semicrystalline polymer matrix, the critical percentage for shell volume concentration is when there is just insufficient amorphous polymer matrix to fully coat shells and form a continuous phase throughout an electro-optical layer necessitating at least one other phase: a dispersed crystalline or spherulite phase. In practice, the degree of crystallinity (specified as a percentage of the overall volume of amorphous and crystalline polymer) in the polymer matrix of such embodiments will be well in excess of that at the critical percentage. Preferably the degree of crystallinity is from 1% to 90%, more preferably from 5% to 50%, and most preferably from 10% to 30%. Furthermore, the birefringence of the crystalline phase in embodiments is 0.02, more preferably 0.04, and most preferably 0.1.

In an electro-optical ink employed within certain embodiments of the present invention, one or more volatile components are added in place of the air phase's volume, and these are evaporated after coating the electro-optical layer to create the air phase.

BRIEF DESCRIPTION OF THE DRAWINGS

Embodiments of the invention will now be described, by way of example, with reference to the accompanying drawings, in which:

FIG. 15b is a representation of optical dot gain in the black state of the electrophoretic ink display device shown in FIG. 15a;

DETAILED DESCRIPTION OF THE INVENTION

The present invention applies to display devices having electro-optical fluid of the electrophoretic ink and liquid crystal types. Most favorably, the electro-optical fluid is microencapsulated. References in this document to electro-optical fluid are applicable to both types.

The current invention enhances the whiteness of an electro-optical, reflective display device by enhancing its diffuse light reflection (i.e. its luminance), and this accrues from enhanced light scattering and opacity of its electro-optical layer. In the electro-optical layer of embodiments, enhancing scattering of light means greater bending and redirecting of light by reflection, refraction and diffraction. Enhancing opacity means that the white state is more effectively able to bend/redirect light away from (i.e., hide) the material used to create its black/dark state thereby minimizing light lost due to absorption by the black material (i.e., suspended black charged particles in an electrophoretic device, and a black background plane in a liquid crystal device).

Preferred embodiments of the current invention enhance diffuse light reflection from the viewer face of a reflective display device in its white state by adding at least one additional phase to its electro-optical layer, this additional phase (s) having a different refractive index to the other phases in the layer and making up part of the volume other than the electro-optical fluid phase in the layer and introducing to the electro-optical layer light scattering centers at the interfaces between such phase and the other phases in the electro-optical layer, the level of diffuse reflected light from the electro-optical layer being a summation of diffuse reflected light from such scattering centers and from the electro-optical fluid phase.

In certain embodiments the additional phase is air, a gas or vacuum, and in such embodiments the electro-optical layer includes three states of matter: a gas, a liquid, and a solid. In other embodiments, the additional phase is dispersed, high refractive index solids/particles, and preferably such solids/particles have a multifaceted/rough surface. In yet other embodiments the additional phase is crystalline polymer.

Figure 1:
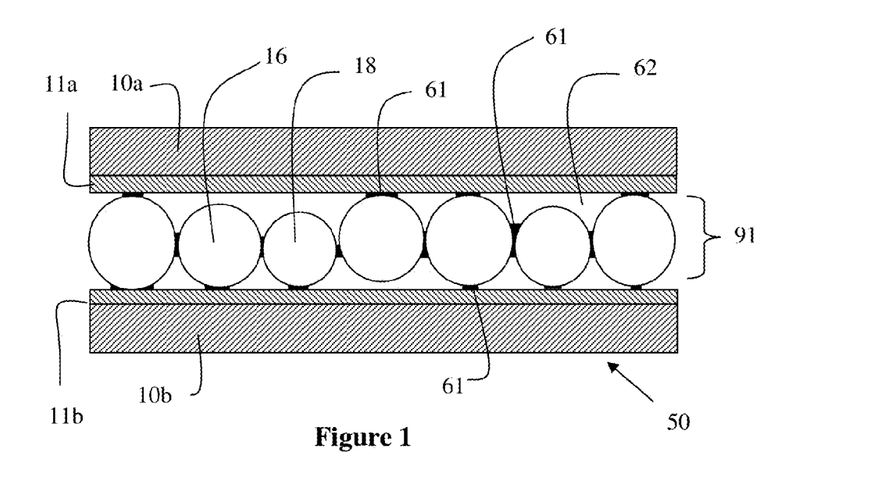
FIG. 1 is a cross sectional view of a reflective, display device whose electro-optical layer is a monolayer of shells surrounded by a continuous air phase.
Figure 2:
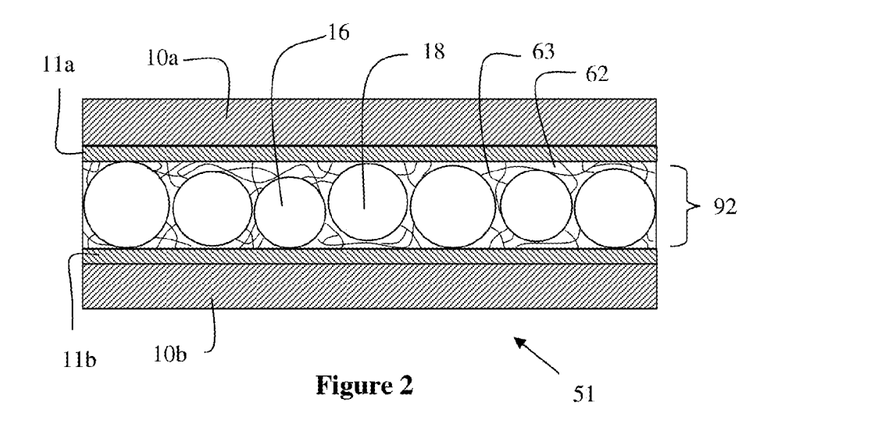
FIG. 2 is a cross sectional view of a reflective, display device whose electro-optical layer is a monolayer of shells surrounded by a continuous air phase and a substantially continuous polymer phase in the form of polymer fibers.
Figure 3:
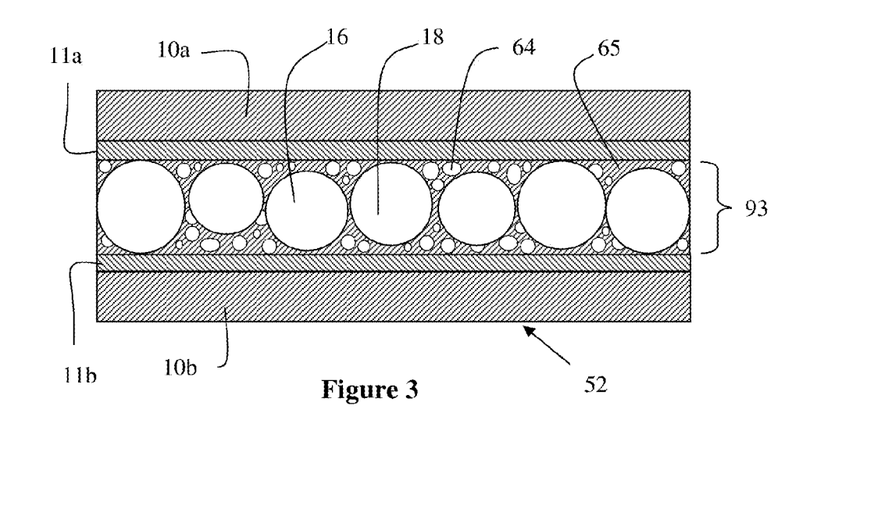
FIG. 3 is a cross sectional view of a reflective, display device whose electro-optical layer is a monolayer of shells surrounded by a continuous polymer matrix having dispersed therein largely discrete air pockets.
Figure 4:
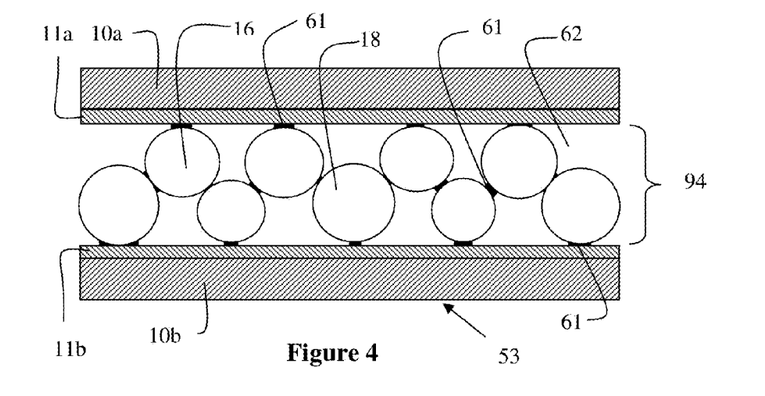
FIG. 4 is a cross sectional view of a reflective, display device whose electro-optical layer is a stacked layer of shells surrounded by a continuous air phase.
Figure 5:
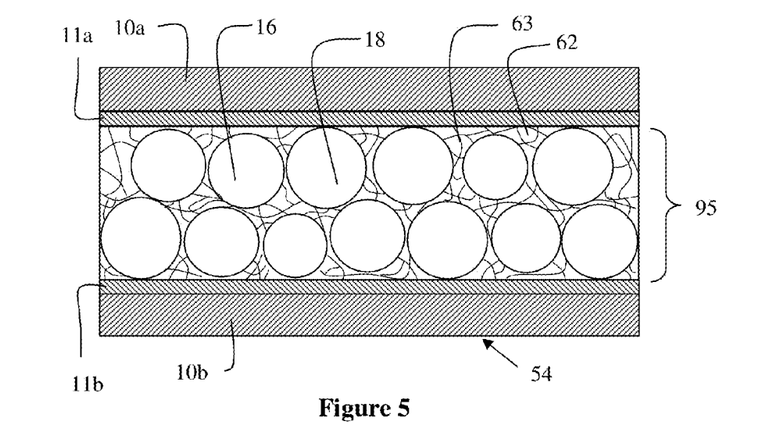
FIG. 5 is a cross sectional view of a reflective, display device whose electro-optical layer is a stacked layer of shells surrounded by a continuous air phase and a substantially continuous polymer phase in the form of polymer fibers.
Figure 6:
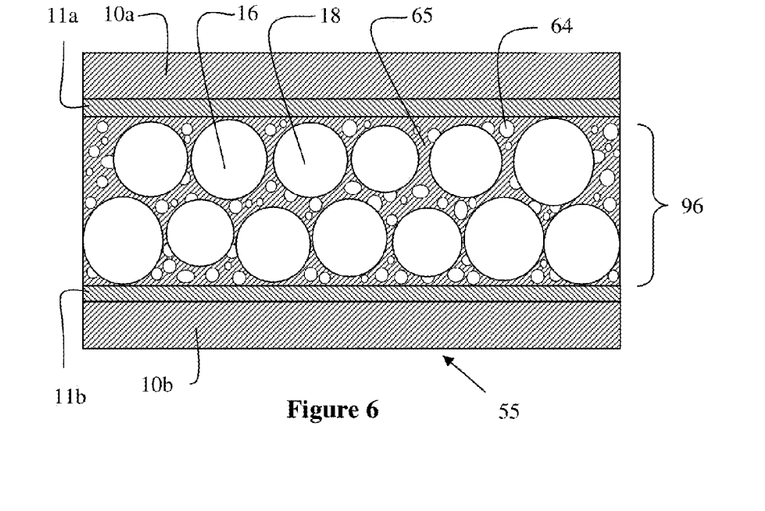
FIG. 6 is a cross sectional view of a reflective, display device whose electro-optical layer is a stacked layer of shells surrounded by a continuous polymer matrix having dispersed therein largely discrete air pockets.
Figure 7:
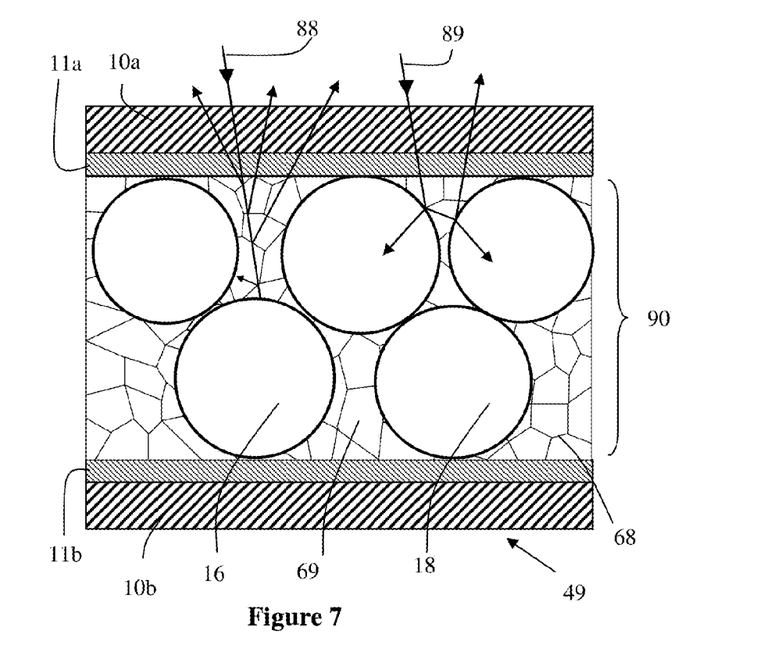
FIG. 7 is a cross sectional view of a reflective, display device in the white state whose electro-optical layer is a stacked layer of shells surrounded by a semicrystalline polymer matrix.

Exemplary embodiments include: the air phase as the continuous phase with discrete polymer fractions bonding shells to each other and to the substrates to form the electro-optical layer as shown in FIGS. 1 and 4; or both the air phase and polymer matrix phase are continuous with the polymer distributed as fibrous network/gel weaving through air and having the electro-optical shells dispersed throughout to form the electro-optical layer as shown in FIGS. 2 and 5; or the air phase is discontinuous and dispersed as air pockets substantially discrete in a porous, but otherwise continuous, polymer matrix with electro-optical shells dispersed in both to form an electro-optical layer as represented by FIGS. 3 and 6; or the polymer matrix phase is continuous and has dispersed within it discrete, high-index solids/particles to form an electro-optical layer as also represented by FIGS. 3 and 6; or the polymer matrix phase is amorphous and near continuous and has dispersed within it polymer crystallite grains/spherulites to form the electro-optical layer as shown in FIG. 7. In the latter case the polymer matrix can be thought of as comprising an amorphous phase and a crystalline phase, and depending on the degree of crystallinity, can be partly or near completely crystalline.

The increased diffuse light reflection for the whole spectrum of visible light in the electro-optical layer has two components:

1. The first component derives from light scattering centers created in the electro-optical layer not just between the added phase and the amorphous, polymer matrix phase, but also between the added phase and the surface of shells. This type of light scattering center, which is independent of the electro-optical volume, is not present in prior art devices because their polymer matrix/binder is a single phase and is index matched to the electro-optical volume; and
2. The second component is that the electro-optical volume inside shells scatters light more efficiently as a consequence of the first component.

The level of diffuse reflected light from the front face of a reflective, display device is then a summation of these two components and arises from interfaces (preferably multifaceted) between phases/mediums of differing refractive index in the electro-optical layer that are both outside the discrete electro-optical volumes, and inside such volumes (the latter will be described next).

Figure 8A:
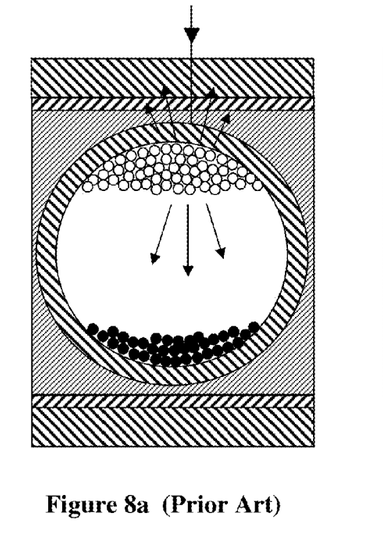
FIG. 8a shows a cross sectional view of a prior art electrophoretic-ink, reflective display.

Before describing how the second component arises—improved light scattering efficiency by the discrete, electro-optical volumes—it is necessary to describe first how electrophoretic ink and liquid crystal devices realize their respective white states in the prior art. When the electro-optical fluid is the electrophoretic ink type, white charged pigment particles (this is normally how the white state particles are described in the prior art) are induced by an electrical field to move into a volume at the front or viewing surface of a shell (synonymous with capsule), see FIG. 8a. But, to call these particles white pigment is confusing because the particles are not opaque or crystalline, they are actually transparent, high refractive index, near amorphous particles in a relatively low refractive index suspending fluid. It is only within electrophoretic ink volumes and at the multifaceted interfaces between the low refractive index suspending fluid and the high refractive index particles that light undergoes surface reflection, transmission (with refracted angle), and possibly diffraction (if the projected axis of a particle approaches the wavelength of visible light). Indeed, if the refractive index of the suspending fluid were to match that of the particles then such particles would transmit nearly all incident light and diffuse reflected light would be negligible. The high refractive index material used most often in prior art electrophoretic ink devices is rutile titanium dioxide ($TiO_2$), its index is 2.73, and the low refractive index suspending fluid is typically a hydrocarbon such as Isopar M from Exxon Mobil, its index is 1.438. The opacity of the particles used for the white state depends primarily on the scattering of the incident light as there is negligible absorption of light. Opacity matters because light transmitted by the layer of particles used for the white state can be absorbed by the black particles at the opposing side/face of a shell's encapsulated volume, this latter case is shown in FIG. 8a. It is thought that in prior art devices absorption of light by the black particles in electrophoretic ink displays causes the white state to appear grey and the diffuse reflected light to be significantly less than 50%. By contrast, in embodiments of reflective, electrophoretic-ink display devices in the present invention the white state's diffuse reflectance exceeds that of prior art electrophoretic ink devices and has generally ≥40% diffuse reflectance, and more preferably ≥45%, and most preferably ≥50%.

Figure 8B:
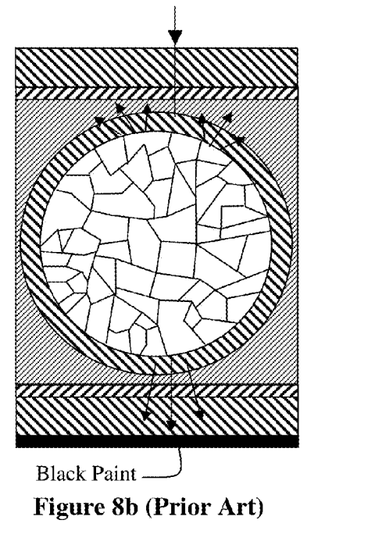
FIG. 8b shows a cross sectional view of a prior art cholesteric, liquid-crystal, reflective display.

When the electro-optical fluid is the liquid crystal type, the birefringent nature of liquid crystal is exploited to create discrete regions within the liquid crystal volume, each region having a uniform refractive index (due to liquid crystal molecules having uniform alignment in the discrete regions) and neighboring regions having a different refractive index thereby creating multifaceted interfaces (between mediums of differing refractive index) within a shell's liquid crystal volume, and light undergoes reflection and transmission (with refracted angle) at each such interface. FIG. 8b shows a liquid crystal volume having multiple regions called domains, each domain has a near uniform refractive index and the liquid crystal is said to exhibit a polydomain state. PCT/EP2008/005151 describes how a polydomain state can be induced in cholesteric liquid crystal by the interaction of the liquid crystal molecules with those of the encapsulating polymer such that the liquid crystal molecules assume an alignment in a local region that diverges from the plane of the polymer surface. U.S. Pat. No. 6,203,723 describes how a polydomain state can be induced in nematic liquid crystal by forming polymer network (referred to as web-like structure) in the liquid crystal volume inside a shell. Most favorably, co-pending PCT application entitled "A Method For Microencapsulating Electro-Optical Fluid" discloses an improved technique. FIG. 8b shows that while significant light scattering occurs inside a liquid crystal shell, the level of diffusely reflected light is poor by comparison with the prior art electrophoretic ink device shown in FIG. 8a. Most of the light is forward scattered towards a black painted plane at the rear face of the display device (i.e., outside the electro-optical layer) where it is absorbed. The level of forward scattered light (and hence absorbed by the black rear plane) in prior art liquid crystal devices of this type is so high (80 to 90% typically) that the white state of such a reflective display is not viable. By contrast, in embodiments of reflective, liquid crystal display devices in the present invention, the white state's diffuse reflectance can exceed that of prior art electrophoretic ink devices, and has generally ≥30% diffuse reflectance, and more preferably ≥40%, and most preferably ≥45%.

The prior art teaches that in general, reflection of light occurs whenever light travels from a phase/medium of a given refractive index into a phase/medium with a different refractive index. A certain fraction of the light is reflected from the interface, and the remainder is refracted. Solving Maxwell's equations for a light ray striking a boundary allows the derivation of the Fresnel equations, which can be used to predict how much of the light is reflected, and how much is refracted in a given situation. As the angle of incident light (to a surface's normal) increases beyond its Brewster's angle the reflected s-polarized light increases exponentially, the p-polarization lags behind. For example, if the polymer of a shell has a refractive index of 1.5 then for a ray entering a shell from air Brewster's angle is about 56 degrees, and for a ray leaving such a shell into air, it is about 33.7%. Total internal reflection of light from a denser phase/medium (high index to low index) occurs if the angle of incidence is above the critical angle. For example, if the polymer of a shell has a refractive index of 1.5, then for a light ray traveling from a shell's polymer into air the incident angle to the surface normal for total internal reflection is 41.8 degrees. In prior art devices such considerations of a shell's interface with the surrounding 'matrix/binder' do not arise because the polymer matrix is continuous and typically refractive index matched to a shell's polymer.

Introducing distributed, and preferably multi-faceted, inter-phase, interface surfaces into the electro-optical layer creates the first component of increased diffuse light reflection referred to above. The benefits of adding such interfaces, each of which is a light scattering center, are:

a) A significant increase in the overall density of scattering centers in the electro-optical layer that a ray encounters along its path, and due to reflection at these scattering centers, an increased path length and increased diffuse reflection from the viewing face of the electro-optical layer.

Figure 9:
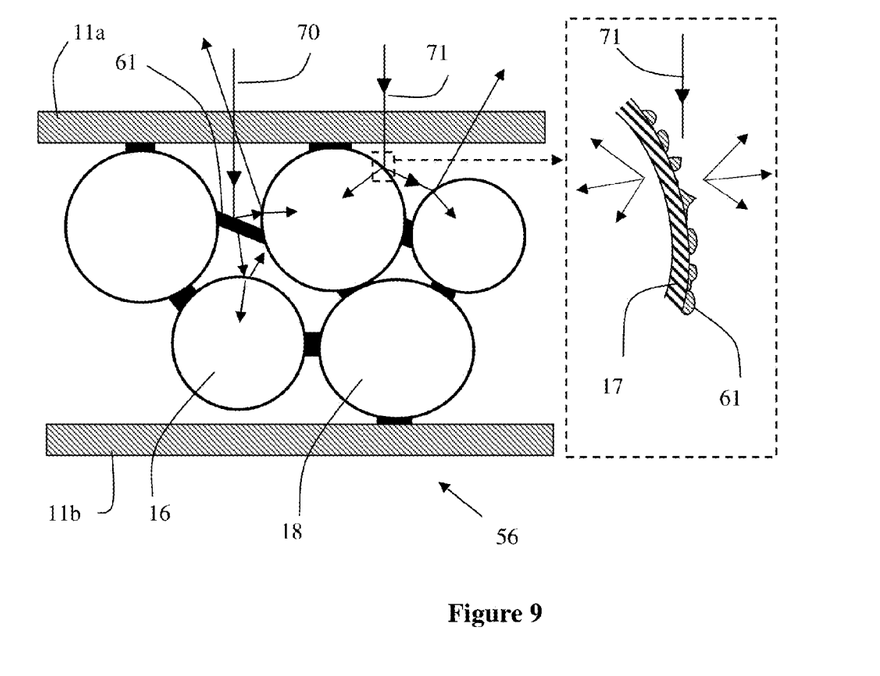
FIG. 9 is a cross sectional view of a reflective, display device in the white state and shows incident light rays being affected by multifaceted air/polymer interfaces.
Figure 11:
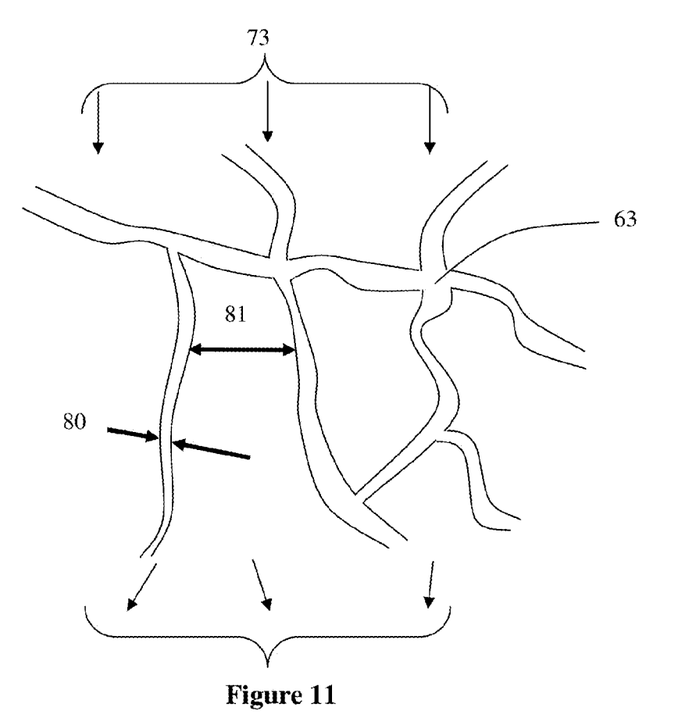
FIG. 11 is a magnified, cross sectional view of the polymer fibers of FIGS. 2 and 5.

For example, in FIG. 9 (a display device in the white state) incident light ray 70 strikes a polymer fraction bridging two shells. Its reflected ray is directed along the plane of the electro-optical layer where it strikes a shell's surface and once again undergoes reflection and transmission. The reflected ray in this instance leaves the electro-optical layer from its viewing face, and the transmitted ray enters an electro-optical volume almost parallel to the plane of the electro-optical layer. Incident light ray 70 is mainly transmitted by the first polymer bridge, and its transmitted ray strikes the surface of a shell to once again undergo transmission and reflection. Similarly, incident light ray 71 undergoes reflection and transmission outside the discrete, electro-optical fluid volumes.

b) Significant diffraction of light in the electro-optical layer that contributes to the overall light scattering efficiency of the layer and thereby increases the probability of light escaping the electro-optical layer from its viewing face. Diffraction is generally most pronounced where the wavelength of light is roughly similar to the dimensions of the diffracting objects. Consequently in certain embodiments, the dimensions of polymer matrix fractions on the surface of shells and bridging shells are preferably similar to or less than the wavelength of visible light; most preferably one or more of the dimensions are 200 to 300 nm. For example, shell surface roughness could be at this scale, or polymer fibers bridging shells could be at this scale. By contrast, there is negligible light diffraction in the polymer matrix volume of prior art devices. In FIG. 9 an exploded view of a shell having a multifaceted surface is shown. The smooth encapsulating wall 17 has bonded to its surface polymer matrix fractions 61 that are preferably 200 to 300 nm fractions/structures to maximize light diffraction of transmitted rays. FIG. 11 is an exploded view of fibers 63 of the polymer matrix type show in FIGS. 2 and 5. Dimension 81 is preferably a multiple of the wavelength of visible light and dimension 80 is preferable 200 to 300 nm to maximize diffraction. These guidelines can equally be applied to polymer fractions bridging between shells of the type shown in FIGS. 1 and 4.

c) The reflection and transmission of diffuse light at each scattering center due to the irregular nature of the interfaces, this is particularly the case if the surface of shells is multifaceted, see the exploded view of such a shell in FIG. 9. As with b), the effect is improved overall light scattering efficiency for the layer. By contrast, prior art devices have smooth, index matched interfaces where present outside the electro-optical volume and so transmit specular light.

The second component of increased diffuse light reflection—improved light scattering efficiency by the discrete, electro-optical volumes in the electro-optical layer—arises because:

a) Incident light falling on the front face of the electro-optical layer is refracted as it enters a shell due to the significant refractive index mismatch between the polymer of a shell and the surrounding air. As a consequence, the transmitted light strikes the electro-optical volume inside a shell more obliquely (further from the normal to the display face) increasing the ability of an electro-optical volume in the white state to reflect more of an incident ray, see incident light ray 72 in FIG. 10 (the display device is shown in the white state).

Figure 10:
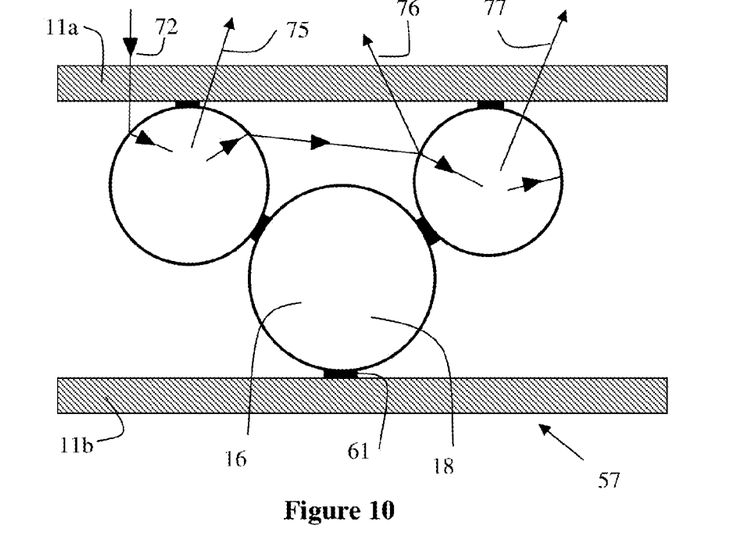
FIG. 10 is a cross sectional view of a reflective, display device in the white state and shows incident light rays being diffusely reflected by electro-optical volumes.

For example, if an incident ray strikes the electro-optical layer at 90 degrees to its surface plane but strikes the side wall of a shell (Rf=1.5) at 60 degrees from the surface normal of the shell, and assuming the interface is air/polymer, then the average reflected light is 8.9% (at the air/shell interface) and the transmitted ray is at an angle of 65.3 degrees to the electro-optical layer plane as it strikes the electro-optical volume inside the shell.

b) Light reflected and transmitted (with refracted angle) by air/polymer facets outside shells in the electro-optical layer can strike neighboring shells with a wide range of angles, and as per a), the greater the incident angle (to the normal to the plane of the electro-optical layer) the greater the reflected light by an electro-optical volume inside a shell in general, see incident light rays 70 and 71 in FIG. 9 (the display device is shown in the white state).

c) Light exiting an electro-optical volume, and traveling broadly in the plane of the electro-optical layer, has an increased likelihood of being reflected to the viewer due to favorably reflection from the air/shell interface of a neighboring shell. In FIG. 10 (the display device is shown in the white state) incident light ray 72 strikes the electro-optical volume inside a shell after being refracted at the air/polymer interface. A fraction 75 of ray 72's light intensity is diffusely reflected by the electro-optical volume in the white state, and a fraction is transmitted broadly in the plane of the electro-optical layer where it undergoes diffuse reflection, ray 76, at the air/polymer interface of a neighboring shell as well as transmission, advantageously this sequence can be repeated many times for incident light ray 72 (ray 77 is analogous with ray 75).

d) Where the surface of shells is multifaceted, the transmitted light into electro-optical volumes will be somewhat diffuse and so present a range of angles increasing the ability of the electro-optical volume to diffusely reflect light to the viewer. Similarly, light exiting a shell will be somewhat diffuse increasing the level of light able to escape from the front face of the electro-optical layer. See the exploded view in FIG. 9.

FIG. 1 is a cross sectional view of an embodiment of a reflective, display device 50. Its electro-optical layer 91 is a monolayer of shells 16 that encapsulate electro-optical volumes 18. Shells 16 are surrounded by a continuous air phase 62 and have polymer matrix fractions 61 generally bonding shells to one or both substrates and to neighboring shells. The volume of the electro-optical layer 91 outside of shells can be described as comprising of two phases: a continuous air phase 62 and a discontinuous polymer matrix phase 61, the latter comprising discrete fractions 61 (or structures). By connecting a signal to optically transparent electrodes 11a and 11b the electro-optical layer 91 can be switched in response to an electrical field from a white (synonymous with bright) state to a black (synonymous with dark) state. Substrates 10a and 10b can be a film such as PET or rigid such as glass. It will be appreciated that electrodes 11a and 11b need not be in direct contact with the electro-optical layer 91, but can be coupled to the layer through for example, a dielectric layer (not shown). It is sufficient that an electrical field between the electrodes provides the necessary field strength to control an electro-optical layer.

FIG. 2 is a cross sectional view of an embodiment a reflective, display device 51. Its electro-optical layer 92 is a monolayer of shells 16 surrounded by a continuous air phase 62 and a substantially continuous and open polymer phase 63 in the form of polymer fibers. Its open structure is show as an exploded view in FIG. 11 where the air phase 62 is everywhere not occupied by the polymer 63.

FIG. 3 is a cross sectional view of an embodiment of a reflective, display device 52. Its electro-optical layer 93 is a monolayer of shells surrounded by a continuous polymer matrix having spatially dispersed therein, discrete pockets 64 which can contain air, a gas or vacuum, or preferably for this type of embodiment, a high refractive index material. Preferably, the high index dispersed phase 64 is dispersed solids having a multifaceted/rough surface. Examples of suitable high index materials generally having a multifaceted surface and in ascending order of refractive index include calcium carbonate (1.63), barite (1.64), clay (1.65), magnesium silicate (1.65), lithopone (1.84), and zinc oxide (2.02). Preferably, the dimension of dispersed pockets/solids is 200 to 300 nm to maximize light diffraction in the electro-optical layer. Preferably such pockets/solids are dispersed discretely in the polymer matrix and comprise 1% to 50% of the available volume (i.e., the volume outside shells in an electro-optical layer), more preferably 3% to 35%, and most preferably 5% to 30%. Furthermore, the refractive index difference between the polymer matrix and high refractive index solids in embodiments is <1.0, more preferably <0.75, and most preferably <0.6. In regard to this latter guideline, it is not generally desirable to use titanium dioxide solids (the 'white' particles of electrophoretic ink) as the dispersed phase 64 in the polymer matrix. While the dispersed phase 64 has been described as a single substance it can advantageously comprise a mixture of substances, for examples solids of differing refractive index, or a mix of air pockets and solids, or solids in air pockets in the polymer matrix.

FIG. 4 is similar to FIG. 1 except instead of a monolayer of shells the electro-optical layer 94 comprises a stacked layer of shells. The figure shows a stacking generally of two shells high, other embodiments can be three or more stacked shells vertically, and shells can be randomly or orderly stacked. FIG. 5 is similar to FIG. 2 except instead of a monolayer of shells the electro-optical layer 95 comprises a stacked layer of shells. FIG. 6 is similar to FIG. 3 except instead of a monolayer of shells the electro-optical layer 96 comprises a stacked layer of shells.

In FIG. 7, the polymer matrix is semicrystalline comprising an amorphous phase and a crystalline phase, and the amorphous phase is interspersed between randomly distributed crystallite grains. Device 49 has an electro-optical layer 90 that comprises stacked, electro-optical shells 16 dispersed in semicrystalline polymer matrix 69. In FIG. 7 a crystallite grain can form a grain boundary (indicated by 68) with another crystallite or with the amorphous polymer, and at such boundaries 68 light is reflected and transmitted (with refraction angle) because the grain boundaries 68 are an interface between phases of different refractive index. Incident light ray 88 strikes a first grain boundary 68, a fraction (typically a few percent) is reflected and the rest is transmitted (with refraction angle). This sequence is repeated in the semicrystalline polymer matrix until part of ray 88 strikes the surface of a shell 16 resulting in a reflected ray and a transmitted ray (not shown). Incident ray 89 in FIG. 7 is similar to incident ray 71 in FIG. 9. It shows how the surface of shells will reflect light if there is a refractive index mismatch with a local crystalline grain, otherwise the ray will be transmitted to the electro-optical volume 18 inside a shell 16 with negligible reflection and refraction if the interface is with the amorphous phase.

FIG. 9 is a cross sectional view of an embodiment of a reflective, display device in the white state and shows incident light rays being affected by air/polymer interfaces. FIG. 10 is a cross sectional view of an embodiment of a reflective, display device in the white state and shows incident light rays being diffusely reflected by electro-optical volumes. FIG. 11 is a magnified, cross sectional view of the polymer fibers 63 of FIGS. 2 and 4. Incident light 73 is diffracted by the polymer phase 63 resulting in increased light scattering as shown by the emerging rays.

Figure 12:
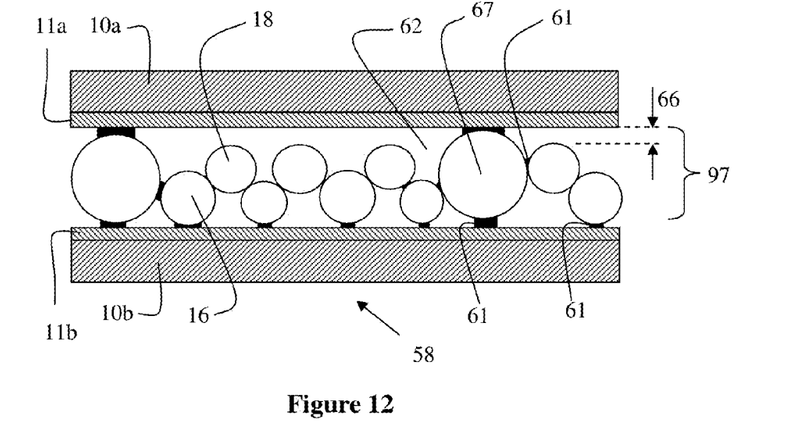
FIG. 12 is a cross sectional view of a reflective, display device and shows an electro-optical layer having an air gap between the top of stacked shells and the top substrate.

FIG. 12 is a cross sectional view of an embodiment of a reflective, display device 58 and shows an electro-optical layer 97 having an air gap 66 between the top of stacked shells 16 and the electrode 11a (of the top substrate 10a). The air gap 66 is provided by dispersing polymer spacer balls 67 in the electro-optical layer whereby the diameter of the spacers 67 is greater than the height of the stacked shells 16. The spacers can be any type suitable for use as cell gap spacers in display devices, for example the Micropearl SP series from Sekisui Chemical GmbH. In such embodiments incident light on device 58 must travel through an air gap 66 before striking shells 16 in the electro-optical layer ensuring that all light rays experience at least one air/polymer interface before entering a shell, and if shells have a multifaceted surface, then all light rays are somewhat diffusely reflected or transmitted at such an interface.

Figure 13:
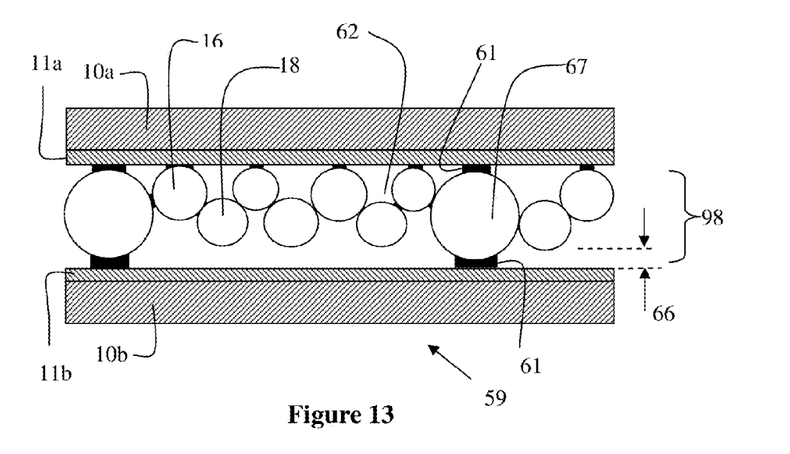
FIG. 13 is similar to FIG. 12 except the air gap is between the bottom of stacked shells and the bottom substrate.

FIG. 13 is similar to FIG. 12 except the air gap 66 is between the bottom of stacked shells 16 and the rear electrode 11b (of the bottom substrate 10b). In this type of embodiment total internal reflection of light in shells facing the rear is favored, this can contribute some percent of increased diffuse light reflection from the front face for liquid crystal display devices. In FIGS. 12 and 13 one substrate is secured to the electro-optical layer only by spacer related structures. In such embodiments preferably the substrate is broadly bonded to spacers by adhesive polymer (as opposed to a point contact) to provide adequate mechanical strength. For example, the substrate could have a thin layer of adhesive already coated onto its surface before it is laminated via spacers to the electro-optical layer.

Figure 14:
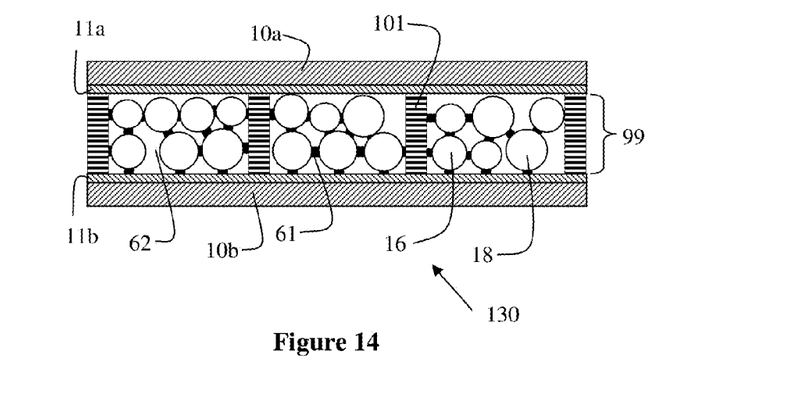
FIG. 14 is a cross sectional view of a reflective, display device comprising replicated polymer walls that divide the electro-optical layer into discrete regions.

FIG. 14 is a cross sectional view of an embodiment of a reflective, display device comprising replicated polymer walls 101 that divide the electro-optical layer into discrete regions. Information on replicated polymer structures is available from one of its proponents Sipix Inc. and their website (www.sipix.com), or in Xerox's U.S. Pat. No. 7,417, 787. FIG. 14 shows a stacked electro-optical layer 99 similar to FIG. 4 except in this case applied between the walls of a replicated structure. Similarly, the polymer walls could be used with any of the other embodiments described above.

In embodiments that have a semicrystalline polymer matrix, the amorphous phase can be a continuous phase or a discontinuous/dispersed phase. The crystalline phase can be crystallite grains made up of lamellae (i.e. thin flat platelets typically 10 to 20 nm thick and several micron long) that in turn are built-up from folded polymer chains as is known from the prior art. A crystallite grain is a phase in which anisotropic polymer chains point in the same direction. Alternatively, the crystalline phase can comprise spherulites, a structural entity that generally dominates polymers crystallized from a polymer melt. In a polymer spherulite the lamellae of folded polymer chains are twisted in the form of a helix and arranged in a radial direction. Polymer spherulites can be positive or negative depending on their refractive index along a radial: negative polymer spherulites have the lowest refractive index in a radial direction and positive polymer spherulites have the highest refractive in a radial direction. Embodiments of the present invention can use either type of spherulite or a mix of both types. A polymer spherulite need not be spherical as it grows from the inside out originating from a seed/nucleation site and merely stops growing in a given radial direction when it impinges on a surface.

In a semicrystalline polymer matrix, a grain boundary 68 (see FIG. 7) is a scattering center outside the discrete, electro-optical volumes similar to a scattering center caused by the interface between air and a polymer matrix fraction 61 (see FIG. 9), or the interface between polymer matrix 65 and a dispersed, mismatched phase 64 (see FIG. 6), or the interface between air and polymer fibers 63 (see FIG. 6). Similarly, diffraction of light by the electro-optical layer is applicable to all embodiments; in relation to those having a semicrystalline polymer matrix, diffraction can be maximized by having crystalline grains having one or more dimensions that are 200 to 300 nm (see earlier discussion of diffraction in relation to FIGS. 9 and 11).

Semicrystalline polymers are only partly crystalline; the polymer crystallites coexist with amorphous regions (random chain orientation) and at the interface between the two there is a refractive index mismatch. In embodiments, use of a semicrystalline polymer matrix also refers to use of a partly crystalline polymer matrix. An example of a partly crystalline polymer matrix is one having spherulite polymer structures dispersed in amorphous polymer. In this case, the diameter of a spherulite is preferably 200 to 300 nm to maximize light diffraction.

Though not shown in a separate figure, the semicrystalline polymer matrix type of embodiment is equally applicable to devices having a monolayer of shells, or devices comprising stacking of shells more than two high.

In preferred embodiments, the discrete volumes of electro-optical fluid are microencapsulated. The techniques of microencapsulation were discussed earlier in the background. Most favorably, co-pending PCT application entitled "A Method For Microencapsulating Electro-Optical Fluid" by the applicant discloses an improved technique for the microencapsulation of electro-optical fluid inside hydrophobic shells: the polymer wall of shells have a densely-crosslinked, polymer-network structure that provides shells with strong chemical resistance (e.g. to the polymer precursors used in an electro-optical ink), and the technique disclosed ensures that despite the use of densely-crosslinked, polymer network structure, shells are mechanically robust (i.e., shells are not brittle). While the latter hydrophobic-shell technique of microencapsulation is preferred, any known technique, whether for hydrophilic shells or hydrophobic shells, can be used in embodiments of the current invention.

Figure 15A:
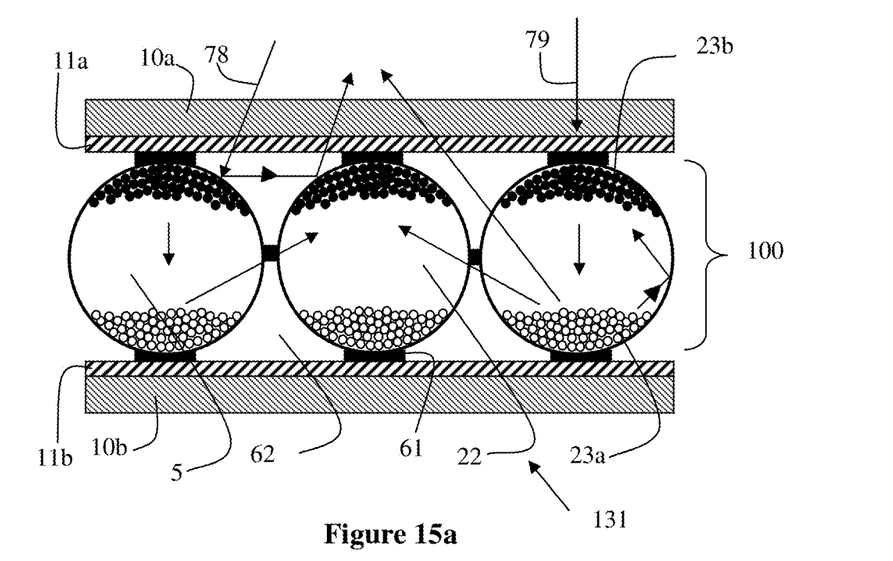
FIG. 15a is a cross sectional view of a reflective, electrophoretic-ink, display device in the black optical state and whose electro-optical layer is a monolayer of shells surrounded by a continuous air phase.

Turning next to the black state, FIG. 15*a* shows a cross sectional view of an embodiment of an electrophoretic ink display device 131 in the black state (synonymous with dark) and having a single layer of shells. In the discrete volumes of electrophoretic ink 22, the black light absorbing particles 23*b* (e.g., carbon black) are located to the front of shells forming generally in a plane parallel and next to the viewing face. Once incident light ray 79 enters an electrophoretic ink volume it is mainly absorbed by the black particles 23*b*, though it may still allow some transmitted light to reach its high refractive index 'white' particles 23*a* aligned generally in a plane parallel and next to the rear face where a significant fraction of such rays can be diffusely reflected in the general direction of a viewer. Those diffusely reflected rays that remain within a shell are absorbed by the black particles, and some will favorably undergo total internal reflection and so be redirected to the black particles where they will be absorbed as shown in FIG. 15*a*, see FIG. 15*a*. This favorable outcome (i.e. total internal reflection) occurs because of the polymer/air interface at a shell's wall and does not occur in prior art devices. A fraction that escapes a shell can enter a neighboring shell and be absorbed by its black particles, or it can escape the electro-optical layer as low-intensity, diffuse, reflected light.

Generally, incident light falling on the multifaceted polymer matrix fractions 61 is scattered and diffusely transmitted where it can reach black or 'white' particles in an electrophoretic ink volume. If it reaches white particles, it can follow a similar outcome to that described in the previous paragraph for the fraction of incident light transmitted by black particles. In this way introducing distributed, multi-faceted, air/polymer interface surfaces into an electro-optical layer that are outside the discrete volumes of electrophoretic ink does not lead to an issue with such scattering centers in the black state. In particular, minimizing, or preferably avoiding, a very high refractive index mismatch for the distributed, multi-faceted, interface surfaces (earlier the guideline for the mismatch was given as being most preferably <0.6) ensures that diffuse light reflection caused by these scattering center has a minimal effect on the viewer's perception of the black state.

Figure 15B:
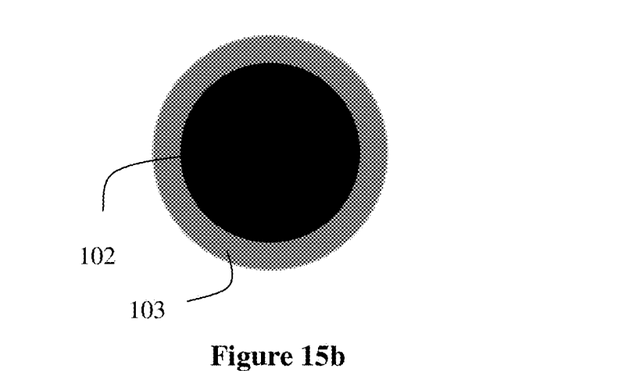

A particular characteristic of electrophoretic ink embodiments of the present invention is shown in FIG. 15*b*. The solid black circular area 102 is a plan view of a shell in the black state and corresponds to the area defined by its black particles 23*b* in a spherical shell. Outside this area is shown as being grey and represents a halo-effect (see 103 in FIG. 15*b*) and arises because diffuse reflected light from areas within the electro-optical layer that are between shells is partly absorbed by the black particles in neighboring shells as described already in relation to FIG. 15*a*. It is as if the black particles cast a shadow over the area between shells. In this regard there is an analogy with the phenomenon known as 'optical dot gain' in inkjet printed black dots on white paper where a black dot appears larger than its actual size (see prior art 'physical dot gain', Yule-Nielsen equation and Murray-Davies equation). This does not arise with prior art electrophoretic ink devices because their electro-optical ink volumes are made to be polygonal in shape and abut one another, see for example Eink Holdings' U.S. 7,109,968.

This halo-effect in the black state of electrophoretic ink embodiments of the present invention means that diffuse light reflected to the viewer from scattering centers outside the electrophoretic ink volume (the basis of increased diffuse light reflection in the white state) are partly absorbed by the black particles of the electrophoretic ink. This permits a favorable compromise between the white and black states of electrophoretic ink devices as increased diffuse reflection from scattering centers outside the electrophoretic ink volume increases the luminance of the white state significantly more than it compromises the luminance of the black state. In this regard, the open, fibrous polymer matrix of FIGS. 2 and 5 is particularly attractive for electrophoretic ink embodiments. It is also beneficial to coat the rear electrode 11*b* with a dielectric mirror layer or the rear substrate 10*b* with a white paint for similar reasons.

Another favorable compromise as a consequence of this halo-effect is that the relative loading of black particles to white particles in an electrophoretic ink can be increased. A higher relative loading of black particles with respect to the prior art will enhance light absorption of the black state (i.e. reduce luminance) but have minimal effect on the luminance of the white state in the current invention. By contrast, the prior art uses a relatively low percentage (10 to 15%) of black particles to white particles to limit light absorption in the white state (see earlier explanation) at the expense of increased luminance in the black state, see examples 1 and 2 of Eink's U.S. Pat. No. 7,411,719.

Advantageously in electrophoretic ink and liquid crystal embodiments of the present invention, the black state appears darker than in prior art devices when a user's field of view also includes pixels (i.e., picture elements) operated in the white state. The increased luminance (i.e., diffuse light reflectance) of the white state of the present invention provides a favorable contrast with neighboring black pixels such that a viewer's visual perception will determine a deeper black for pixels within the same field of view. Even if the black has increased absolute luminance, a viewer's visual perception has greater sensitivity to contrast and so black pixels in the present invention will appear darker side-by-side with white pixels having increased luminance.

Figure 16:
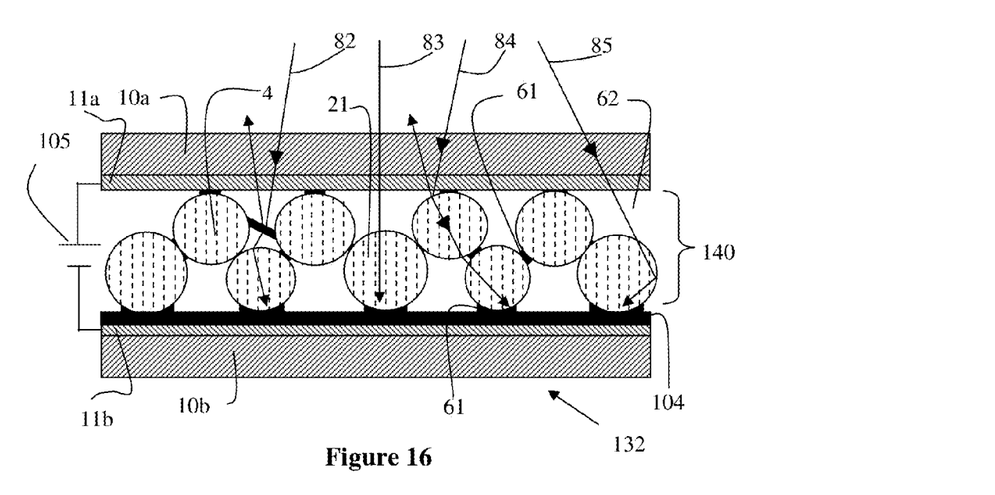
FIG. 16 is a cross sectional view of a reflective, liquid crystal, display device in the field aligned state and corresponds with the black optical state.

FIG. 16 shows a cross sectional view of an embodiment of a cholesteric liquid crystal display device 132 in the black state (synonymous with dark) and having its shells 4 stacked up to two high. The discrete volumes of liquid crystal 21 are aligned by an electrical field applied between electrodes 11a and 11b and present a uniform refractive index to incident light. Preferably the ordinary refractive index of the liquid crystal is close to matching (within 0.01) or matches the polymer in a shell's wall and the polymer fractions 61 of the polymer matrix phase. Incident light ray 83 strikes a shell's surface and about 4% of its intensity is reflected and 96% transmitted. A black absorbing layer 104 on the rear electrode 11b absorbs the transmitted light. Incident ray 84 strikes a first shell where 4% is reflected and 96% is transmitted. On exiting the first shell the light is once again reflected (about 4%) and transmitted (96%) and so on until the black layer 104 absorbs the transmitted ray. An incident ray 82 strikes a polymer matrix fraction 61 bridging two shells. It is reflected (about 4%) and transmitted (96%) and so on until the black layer 104 absorbs the transmitted ray. Incident ray 85 strikes a shell, its transmitted ray strikes the sidewall of the shell and is totally internally reflected by the polymer/air interface, the black layer 104 then absorbs the reflected ray.

Advantageously in embodiments of liquid crystal display devices the black, light absorbing layer 104 is applied over the rear electrode 11b to avoid light reflecting from the air/electrode interface (e.g. air and indium tin oxide). Alternatively the light-absorbing layer 104 can be applied to the outer face of the substrate 10b (as typical of the prior art and shown in FIG. 8b). This latter case enhances diffuse light reflectance of the white state in embodiments of the present invention though at the expense of increased luminance in the black state.

When spherical shells microencapsulating liquid crystal are in the field aligned state the front semi-sphere of a shell (that presenting a surface to an incident light ray) acts as a lens generally focusing incident light at the focal point (when a medium having a lower refractive index (e.g. air) surrounds a shell). The focal length in the image space for a single refractive index volume (i.e. liquid crystal index matched to a shell's wall) in air is given by:

focal length=(refractive index)(shell radius)/(refractive index−1)

For example, if the ordinary refractive index of the liquid crystal volume is 1.5 and incident light rays are perpendicular to the viewing face of the display device, then:

focal length=3×shell's radius

Figure 17:
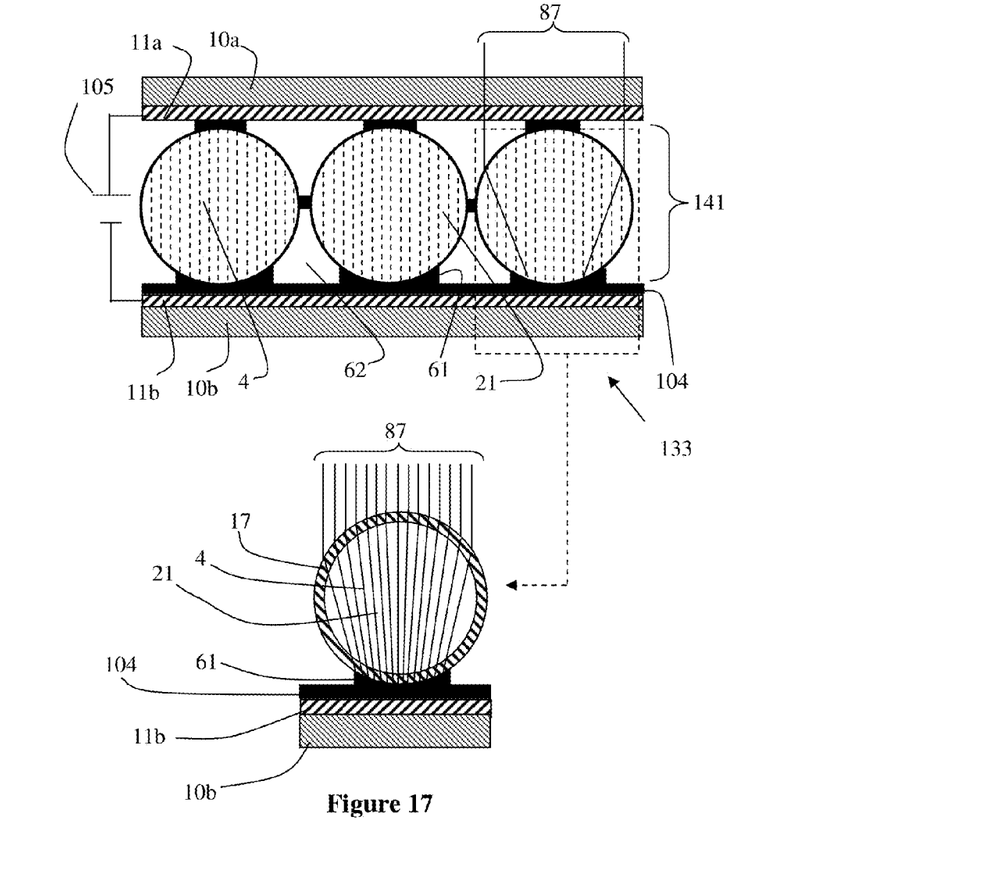
FIG. 17 is similar to FIG. 16 except the liquid crystal layer is a monolayer of shells, and a portion of a shell's rear semisphere makes an optical contact with a black, light absorbing layer.

Advantageously light is focused by the front semi-sphere of a shell to pass through a portion of a shell's rear semi-sphere that has an optical interface to a black light-absorbing layer 104 ensuring that the light-ray bundle defined by that circular optical interface is absorbed with negligible surface reflection (see the exploded view in FIG. 17). Preferably the optical interface is make by a polymer matrix fraction 61 that is indexed matched to the polymer in a shell's wall, and preferably the diameter of the optical interface is sufficiently large to capture most light rays capable of being generally brought to a focus at the focal length of the top semi-sphere. Such a favorable scheme is shown in FIG. 17.

FIG. 17 is similar to FIG. 16 and shows an embodiment of a cholesteric liquid crystal display device 133 in the black state having a monolayer of shells 4 whose liquid crystal 21 is aligned by an electrical field. Incident light ray bundle 87 generally perpendicular to the viewing face is brought to a focus at the focal length (outside a shell). The exploded view in FIG. 17 shows ray bundle 87 passing from a liquid crystal volume inside a shell in to the shells' wall, and then, due to an optical interface made by a polymer matrix fraction 61, the transmitted ray bundle is absorbed by a black layer 104 with negligible reflection. Favorably, total internal reflection at a polymer/air interface is suppressed for the portion of a shell's rear semi-sphere in optical contact with a black, absorbing layer 104. The technique for suppressing total internal reflection for a portion of a shell's rear face (i.e. making an optical interface with polymer) can also be applied to vertically stacked and aligned liquid crystal shells whereby an incident ray bundle is brought to a focus by a front shell and is transmitted to a rear shell and absorbed by an absorbing layer on the rear face with negligible reflection from once the ray bundle enters the front shell.

Strategies for optimizing the white and black states of embodiments of the current invention include:
a) Varying the mean shell diameter and/or the distribution of sizes to increase or decease the air/shell interface area in an electro-optical layer. For example, halving the mean diameter of mono disperse shells will double the shell surface interface area with air and increase the number of shells by a factor of eight for the same volume of electro-optical fluid. This example is favorable for the white state (increased diffuse reflection) but could increase the brightness (i.e., diffuse reflection) of the black state.
b) Selecting between a monolayer of shells or stacked shells in the electro-optical layer. The latter favors the white state while the former favors the black state.
c) Causing the surface of shells to be multifaceted in the electro-optical layer. This favors the white state but would weaken the focusing ability of liquid crystal shells in the black state (as discussed earlier). It is not as significant a consideration for the black state of electrophoretic ink display devices.
d) Using more or less polymer matrix precursor in the electro-optical ink, and selecting the components in the precursors (discussed later).

Figure 18:
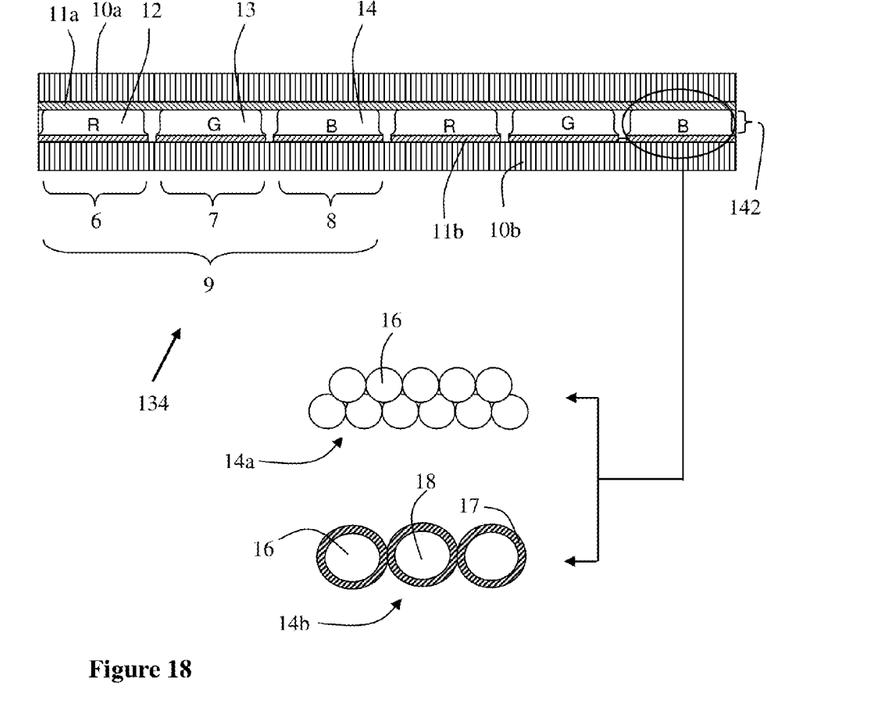
FIG. 18 is a cross sectional view showing a color display device having discrete color regions corresponding to subpixels in the electro-optical layer.

Turning next to color display devices. Color can be realized in the present invention by overlaying the electro-optical layer of embodiments (i.e. those capable of white, black and intermediate gray states) with a color filter (RGB or Pentile matrix types for example) and dividing pixels into addressable subpixel regions, these and other details will be familiar from the prior art. Alternatively FIG. 18 shows a color display device where the optically active layer is itself colored and eliminates the separate color filter of prior art color devices. Rather than being a continuous, monochrome layer the electro-optical layer 142 is divided into discrete regions corresponding to color: for example, red, green and blue regions.

Blue region 14 is shown in greater detail as 14a and 14b. It comprises shells 16 that can be either electrophoretic ink type or liquid crystal type. The shells have blue-color-creating, electro-optical fluid 18 inside. Any of the embodiments suitable for a monochrome electro-optical layer can be applied to the discrete electro-optical regions. For example, shells can be stacked, 14a, or be a monolayer, 14b. Electro-optical fluid 18 may be any known type (of electrophoretic ink or liquid crystal) capable of transmitting, reflecting, or absorbing selective visible light wavelengths to create colored light. For example, electro-optical fluid 18 may be an electrophoretic ink comprising at least one color (other than black or white) of suspended particles, or the suspending fluid itself may provide the color. Electro-optical fluid 18 may be a liquid crystal fluid having incorporated therein dichroic dye and be one of the types nematic, cholesteric or smectic.

In electrophoretic ink devices the 'white' particle can be replaced by a color particle (synonymous with pigmented particle), and in embodiments of the present invention where this pertains the disclosed teachings for the 'white' state can readily be applied to a color state. Diffusely reflected light by color particles in an electrophoretic ink volume is colored light and the color particles absorb selective visible wavelengths. For those visible wavelengths that are selectively absorbed by the color particles in the color state a situation similar to the black state exists as both particle types in an electrophoretic ink volume are light absorbing (i.e. the disclosed teachings for the black state operate in the color state for those wavelengths that are to be absorbed), and favorably undesired wavelengths are absorbed by striking either color particles or black particles with an electrophoretic ink volume.

An analogous situation exists for color liquid crystal devices where the color arises from dichroic dye with selective absorption solubilized in the liquid crystal phase. Diffusely reflected light by a dichroic liquid crystal volume in the unpowered or polydomain state is colored light and the dichroic molecules absorb selective visible wavelengths. In the powered or field aligned state the light-absorbing layer 104 absorbs all wavelengths.

A characteristic of color devices of the present invention is that diffuse white light reflected to the viewer by air/polymer interfaces in the electro-optical layer increases the spectral power distribution of a color, and due to the phenomenon known as metamerism, the apparent colors of a display device can be matched with colors produced with different spectral power distributions (e.g. a color subpixel having no white light component). With metamerism different combinations of light across all visible wavelengths can produce an equivalent eye response and the same tristimulus values or color sensation, and so low-level diffuse white light reflection from outside of the electro-optical volumes in an electro-optical layer can enhance color luminance.

Metamerism is equally applicable to color devices that use a color filter as discussed earlier. In this case the low-level diffuse white light reflection from outside of the electro-optical volumes of a subpixel's area pass through a subpixel's color filter and emerge as low-level colored light that adds to a pixel's spectral power distribution. The metamerism phenomenon allows the resulting pixel color (the combined spectral power distribution of its subpixels) to be matched with (or mapped to) a required color reference.

Turning next to techniques for preparing the electro-optical layer of embodiments of the present invention. The electro-optical layer is prepared from an electro-optical ink comprising a suspension of electro-optical shells in a solution of polymer matrix (synonymous with binder) precursors. The ink may be coated onto a substrate using any suitable method such as screen-printing or doctor blade coating. The polymer matrix precursors may form a hydrophobic or hydrophilic polymer when cured to a solid form. Co-pending PCT application entitled "A Method For Microencapsulating Electro-Optical Fluid" by the applicant gives background information and techniques on screen-printing an electro-optical ink, and discloses forming monochrome and colored, electro-optical layers on a substrate. In particular, it discloses a method to screen-print an electro-optical layer having colored subpixel regions, and in this regard is well suited to screen-printing the reflective, color display device shown in FIG. 18.

Preferably, free-radical polymerisation by ultra-violet and/or visible light is used to cure polymer matrix fractions 61. It is observed that photoinitiator blends that combine different chemistries—class I and class II—are particularly suitable for photocuring hydrophobic, electro-optical inks based on acrylate, methacrylate or vinyl monomers. For example, an acylphosphineoxid such as Irgacure 819, an a-hydroxyketone such as D1173 (both are available form Ciba Speciality Chemicals), and a benzophenone such as Esacure TZT (2,4,6-trimethylbenzophenone+4-methylbenzophenone, available from Lamberti Spa) achieve very good through curing of prints from 10 to 100 micron in thickness. Preferably the photoinitiator blend is added at the rate of 1-12% by weight of the polymer matrix precursor solution (i.e., including crosslinking and monofunctional monomers), and more preferably at 3 to 8%. If an ink contains a volatile component such as a solvent then this component would typically be evaporated before photocuring. The prior art provides several solutions to overcoming oxygen-inhibition when photocuring the wet, electro-optical print, for example, covering the wet layer with a nitrogen blanket (i.e. nitrogen rich atmosphere) while curing.

The electro-optical ink can also employ a film forming technique whereby an ink's continuous phase (i.e., the liquid suspending the colored shells) reduces to polymer matrix fractions 61 once its solvent is evaporated. Film forming on evaporation of a solvent can occur due to polymer being present in the form of a latex, or due to polymer being solubilized in the solvent.

The maximum loading by volume of monodisperse, spherical shells in an electro-optical layer having a monolayer of shells (i.e. of the types shown in FIGS. 1 to 3) is 58% (shells touching neighbors); in an electro-optical layer having ordered stacking of shells it is 74% (shells touching neighbors) and in one having random stacking of shells it is 64% (i.e. generally of the types shown in FIGS. 4 to 6). This is a guide to the upper volume limit achievable for shells having a narrow distribution of size/diameter in an electro-optical layer, it only applies to shells that retain their spherical shape when coated and cured. In the prior art it is common for electrophoretic ink shells microencapsulated by a complex coacervation technique to assume a closely packed polygonal shape on evaporation of a solvent, and the shell loading in the resultant, electro-optical layer can be up to 80%. Preferably in the electro-optical layer of the present invention shells retain a generally spherical shape.

A characteristic of the electro-optical layer of embodiments of the present invention is that the shell volume concentration in the layer, expressed as a percentage of the overall volume comprising shells and polymer matrix/binder, exhibits a critical percentage. For a given electro-optical layer shell stacking, and shell size distribution, the critical percentage is when there is just insufficient polymer matrix to fully coat shells and form a continuous phase throughout an electro-optical layer necessitating at least one other phase (e.g., air, or high-index, solid particles). In practice the shell volume concentration in embodiments of the present invention is generally well in excess of this critical percentage. By contrast, in the prior art the shell volume concentration must be less than this critical percentage.

In embodiments having a semicrystalline polymer matrix (e.g., FIG. 7) the concept of a shell volume concentration having a critical percentage is also applicable. In this case the polymer matrix is treated as comprising a quasi-continuous, amorphous phase and a dispersed crystalline (or spherulite) phase. At the critical percentage there is just insufficient amorphous polymer matrix to fully coat shells and form a continuous phase throughout an electro-optical layer necessitating at least one other phase: a dispersed crystalline or spherulite phase. In practice, the degree of crystallinity (specified as a percentage of the overall volume of amorphous and crystalline polymer) in the polymer matrix of such embodiments will be well in excess of that at the critical percentage. Preferably the degree of crystallinity is from 1% to 90%, more preferably from 5% to 50%, and most preferably from 10% to 30%. Furthermore, the birefringence of the crystalline phase in embodiments is $\geq 0.02$, more preferably $\geq 0.04$, and most preferably $\geq 0.1$.

The concept of a critical percentage can be extended to a method to formulate electro-optical ink for use in embodiments. In the first instance an ink for those embodiments having an air, gas or vacuum phase as part of the volume surrounding shells in the electro-optical layer will be discussed. The volume of the polymer matrix precursor solution in the electro-optical ink will not be sufficient to disperse shells discretely, but adding a volatile phase (or phases) to the suspension allows shells to be dispersed and the viscosity to meet requirements for coating electro-optical ink. For example, electro-optical ink suitable for screen-printing an electro-optical layer in embodiments is generally paste-like and its viscosity is from 1,000 to 50,000 centipoise (cP), more preferably from 3,500cP to 25,000cP, and most preferably from 5,000cP to 15,000cP. The volatile phase is removed by evaporation/drying after coating and before curing (or as part of curing) to create an optical-layer having a discontinuous polymer matrix phase.

A sufficient percentage by volume of polymer matrix precursor solution is that which allows shells to bond with neighboring shells, shells to bond with substrates that they are in contact with, and the electro-optical layer to develop adequate mechanical robustness for the application contemplated. Consideration also should be given to providing sufficient polymer matrix precursor solution to form the distributed, air/polymer interface surfaces comprising bridging polymer matrix fractions and, in certain embodiments, multifaceted structures on the surface of shells as described earlier in relation to the 'white' state.

Advantageously, adding one or more volatile components to an electro-optical ink allows some of the polymer matrix precursors to be polymer strands, polymer gel/network fractions, block copolymer fractions, or fibrous polymer fractions as these promote the creation of multifaceted structures in the electro-optical layer. The volatile component may or may not solubilize the polymer matrix precursors. For example, hydrophobic polymer matrix precursors could be dispersed but not solubilized in a hydrophilic solvent such as water causing the hydrophobic components to be driven to the interface with hydrophobic shells in the electro-optical ink. Evaporation of the volatile component may cause the wet coated electro-optical layer to settle and reduce in thickness. Curing the polymer matrix dispersed phase solidifies the electro-optical layer.

In embodiments having air, a gas (e.g., nitrogen) or vacuum as a continuous phase in the electro-optical layer, the edge of the display device is preferably hermetically sealed all around to prevent atmospheric moisture from penetrating the electro-optical layer. Suitable edge-seal material includes the Photolec series from Sekisui (Japan). Preferably, such embodiments also have sealed electrodes in the display area, for example, a silicon dioxide (or SiOx) coating over indium tin oxide (ITO) electrodes, as there is no longer a continuous polymer matrix/binder phase to provide an electrode seal.

In embodiments having dispersed solids in a continuous polymer matrix (e.g., FIGS. 3 and 6), the volume of the polymer matrix precursor solution in the electro-optical ink will not be sufficient to disperse shells and solid particles discretely, but adding a volatile phase (or phases) to the suspension allows shells and solid particles to be dispersed and the viscosity to meet requirements for coating electro-optical ink. Once coated or printed the volatile phase can be removed by evaporation and the polymer matrix cured as just described in relation to embodiments having an air phase.

Similarly, in embodiments having a semicrystalline polymer matrix the volume of amorphous polymer matrix precursor solution in the electro-optical ink will not be sufficient to disperse shells or crystallites discretely, but adding a volatile phase (or phases) to the suspension allows shells and crystallites to be dispersed and the viscosity to meet requirements for coating electro-optical ink. In embodiments the crystallites can be prepared in an earlier stage and added to the ink as polymer fractions, such fractions can be anisotropic (i.e. crystalline) polymer gel fractions or spherulite polymer gel fractions. In embodiments the crystallites can be polymerized at the same time as the amorphous polymer matrix. For example, the polymer precursors for the crystalline structures can be liquid crystal monomer (also known as liquid crystalline monomer, and reactive mesogen monomer), and preferably has added chiral material to form helicoidal structures as are known from the prior art. Liquid crystal monomer includes monofunctional and difunctional (i.e. crosslinker) acrylate types such as the RM series available from Merck (JP). Such monomer(s) are heated to the nematic phase temperature to form helicoidal structures when chiral material is present. Cooling the monomer to room temperature will preserve this crystalline/spherulite order and allow the monomer to be added to an electro-optical ink. The ink can then be coated and cured as previously described.

The invention claimed is:
1. A method of manufacturing a reflective display device comprising:
providing a substrate;
depositing an electro-optical ink on said substrate, said electro-optical ink comprising a plurality of microencapsulated electro-optical fluid shells dispersed in a polymer pre-cursor; curing said electro-optical ink to provide an electro-optical layer in which said shells are maintained in a polymer matrix having at least two-phases, at least one of said phases in said polymer matrix having a refractive index differing from that of said shells; and providing at least one electrode in contact with said electro-optical layer to, in use, control the state of said electro-optical layer.

2. The method according to claim 1, wherein at least one of said phases has a refractive index closely matching that of said shells.

3. The method according to claim 1, wherein at least one of said phases is an amorphous polymer.

4. The method according to claim 3 wherein said refractive index difference between an amorphous polymer phase and others of the at least two phases is<1.0.

5. The method according to claim 4 comprising dispersing particles within said amorphous phase of said polymer matrix.

6. The method according to claim 3 comprising dispersing a crystalline polymer phase within said amorphous phase of said polymer matrix.

7. The method according to claim 3 wherein said amorphous phase is continuous or near continuous and said at least one other phase is discrete or semi-continuous.

8. A display device produced according to the method of claim 3, wherein said electro-optical layer includes less amorphous polymer than is required to fully coat said shells and to fill the volume between said shells throughout said electro-optical layer.

9. The method according to claim 1 in which at least one of said phases comprises one of: air, a gas or a vacuum.

10. The method according to claim 9 wherein said air phase is a continuous phase and a polymer phase is disjointed and distributed spatially within said electro-optical layer.

11. The method according to claim 1 wherein at least one of said phases has a multifaceted interface surface with the other of said phases.

12. The method according to claim 1 comprising creating light scattering centers in said polymer matrix along interfaces between one of said phases and another of said phases so that, in use, the level of diffuse reflected light from said electro-optical layer is a summation of diffuse reflected light from said scattering centers in said polymer matrix and from scattering centers in said electro-optical fluid shells.

13. The method according to claim 1 comprising providing one or more volatile components within said electro-optical ink, and wherein said curing includes evaporating said volatile components to create an air phase in said polymer matrix.

14. A reflective, electrophoretic display device produced according to the method of claim 1 having a white state diffuse reflectance>=40%.

15. A reflective, electrophoretic display device produced according to the method of claim 1 comprising colored charged particles in suspension within said electro-optical fluid shells.

16. A reflective, liquid crystal display device produced according to the method of claim 1 having a white state diffuse reflectance>=30%.

17. A reflective, liquid crystal display device produced according to the method of claim 1 comprising a dichroic dye with selective absorption solubilized in a liquid crystal within said electro-optical fluid shells.

18. A display device produced according to the method of claim 1 in which said polymer matrix is semicrystalline polymer comprising two phases, one phase being an amorphous polymer and the other phase being a crystalline polymer.

19. The display device according to claim 18 wherein at least one of said phases comprises one of: a dispersed crystalline or spherulite phase.

20. The display device according to claim 18 wherein the degree of crystallinity of the polymer matrix is from 1% to 90%.

21. The display device according to claim 18 wherein the birefringence of the crystalline phase is>=0.02.

22. The method according to claim 1, wherein at least one of said phases is a network of polymer fibers.

23. A display device produced according to the method of claim 1 in which said polymer matrix is arranged to, in use, either: reflect, refract, or diffract light.

24. A display device produced according to the method of claim 1 in which, in use, the electro-optical layer exhibits a halo-effect in a black state.

* * * * *